US008755329B2

(12) United States Patent
Faccin et al.

(10) Patent No.: US 8,755,329 B2

(45) Date of Patent: Jun. 17, 2014

(54) METHODS AND APPARATUS FOR VOICE DOMAIN OPERATION

(75) Inventors: Stefano Faccin, Hayward, CA (US); Chen Ho Chin, Deerlijk (BE); Richard Charles Burbidge, Hook (GB)

(73) Assignee: BlackBerry Limited, Waterloo (CA)

(*) Notice: Subject to any disclaimer, the term of this patent is extended or adjusted under 35 U.S.C. 154(b) by 113 days.

(21) Appl. No.: 12/813,954

(22) Filed: Jun. 11, 2010

(65) Prior Publication Data

US 2011/0305192 A1 Dec. 15, 2011

(51) Int. Cl.
*H04L 12/56* (2006.01)
*H04W 4/00* (2009.01)

(52) U.S. Cl.
USPC .......................................... 370/328; 370/352

(58) Field of Classification Search
None
See application file for complete search history.

(56) References Cited

U.S. PATENT DOCUMENTS 5,353,332 A 10/1994 Raith et al.
6,870,820 B1 3/2005 Forssell et al.
6,965,948 B1 11/2005 Eneborg et al.
7,366,152 B2 4/2008 O'Neill et al.
7,856,226 B2 12/2010 Wong et al.
7,904,055 B2 3/2011 Lee et al.
7,990,957 B2 8/2011 Song et al.
8,064,907 B2 11/2011 Gallagher et al.
8,194,613 B2 6/2012 Lee et al.
8,238,267 B2 8/2012 Dwyer et al.
2003/0045290 A1 3/2003 Tuohimetsa et al.
2003/0105864 A1 6/2003 Mulligan et al.
2004/0184452 A1 9/2004 Huotari et al.
2004/0203775 A1 10/2004 Bourdeaut et al.
2004/0266435 A1 12/2004 de Jong et al.
2005/0213541 A1 9/2005 Jung et al.
2007/0064709 A1 3/2007 Holmstrom et al.
2007/0130465 A1 6/2007 Zeng et al.
2007/0173264 A1 7/2007 Duan
2007/0174443 A1 7/2007 Shaheen et al.
2007/0206620 A1 9/2007 Cortes et al.
2008/0020745 A1 1/2008 Bae et al.
2008/0102896 A1 5/2008 Wang et al.
2008/0125120 A1 5/2008 Gallagher et al.
2008/0188247 A1 8/2008 Worrall (Continued)

FOREIGN PATENT DOCUMENTS

SG 176236 1/2012
WO 2008013291 1/2008

(Continued)

OTHER PUBLICATIONS

3rd Generation Partnership project;Technical Specification Group; Radio Access Network (RAN); Working Group 2 (WG2); "Voice Mode Selection for CS Fallback and IMS", 3GPP TSG SA WG2 Meeting #73, Tallin, Estonia, Mar. 11, 2009, 6 pages.

(Continued)

*Primary Examiner* — Marcus R Smith

(74) *Attorney, Agent, or Firm* — Hanley, Flight & Zimmerman, LLC

(57) ABSTRACT

Methods and apparatus for voice domain operation are described herein. One example method includes determining that an LTE network is not preferred for voice service provision; storing an identification of the LTE network that is not preferred for voice service provision; and accessing the stored identification of the LTE network that is not preferred for voice service provision.

22 Claims, 6 Drawing Sheets

(56) References Cited

U.S. PATENT DOCUMENTS

2008/0220782 A1 9/2008 Wang et al.
2008/0261593 A1 10/2008 Wong et al.
2008/0305825 A1 12/2008 Shaheen
2009/0036131 A1 2/2009 Diachina et al.
2009/0104910 A1 4/2009 Lee et al.
2009/0111423 A1 4/2009 Somasundaram et al.
2009/0154408 A1 6/2009 Jeong et al.
2009/0238117 A1 9/2009 Somasundaram et al.
2009/0238143 A1 9/2009 Mukherjee et al.
2009/0239584 A1 9/2009 Jheng et al.
2009/0268635 A1 10/2009 Gallagher et al.
2009/0270097 A1 10/2009 Gallagher et al.
2009/0270098 A1 10/2009 Gallagher et al.
2009/0280814 A1 11/2009 Farnsworth
2009/0285157 A1 11/2009 Yeoum et al.
2010/0022241 A1 1/2010 Hokao
2010/0048168 A1 2/2010 Fox
2010/0075651 A1 3/2010 Hallenstal et al.
2010/0075670 A1 3/2010 Wu
2010/0093350 A1 4/2010 Wang et al.
2010/0098023 A1 4/2010 Aghili et al.
2010/0099402 A1 4/2010 Wu
2010/0120455 A1 5/2010 Aghili et al.
2010/0130218 A1 5/2010 Zhang et al.
2010/0172347 A1* 7/2010 Zisimopoulos ............... 370/352
2010/0182971 A1 7/2010 Chin
2010/0234026 A1 9/2010 Tenny et al.
2010/0260105 A1 10/2010 Keller et al.
2010/0265847 A1 10/2010 Lee et al.
2010/0265884 A1 10/2010 Vikberg et al.
2010/0265914 A1* 10/2010 Song et al. .................... 370/331
2010/0278146 A1 11/2010 Aoyama et al.
2010/0279648 A1 11/2010 Song et al.
2010/0297979 A1 11/2010 Watfa et al.
2010/0329244 A1 12/2010 Buckley et al.
2011/0002267 A1 1/2011 Dwyer et al.
2011/0002268 A1 1/2011 Dwyer et al.
2011/0002327 A1 1/2011 Dwyer et al.
2011/0009113 A1* 1/2011 Vikberg et al. ............ 455/422.1
2011/0045830 A1* 2/2011 Wu ........................... 455/435.2
2011/0158165 A1* 6/2011 Dwyer et al. ................ 370/328
2011/0171924 A1 7/2011 Faccin et al.
2011/0171925 A1 7/2011 Faccin et al.
2011/0171926 A1 7/2011 Faccin et al.
2011/0274090 A1 11/2011 Hallensal et al.
2012/0014324 A1 1/2012 Dwyer et al.
2012/0014354 A1 1/2012 Dwyer et al.
2012/0014381 A1 1/2012 Dwyer et al.
2012/0077497 A1 3/2012 Shaheen

FOREIGN PATENT DOCUMENTS

WO 2009102368 8/2009
WO 2009151372 12/2009
WO 2010141784 12/2010
WO 2011020002 2/2011

OTHER PUBLICATIONS

International Search Authority, International Search Report and Opinion issued in PCT/US2011/039807, dated Nov. 16, 2011, 13 pages.

3rd Generation Partnership Project; Technical Specification Group Service and System Aspects; Circuit Switched (CS) fallback in Evolved Packet System (EPS); Stage 2 (Release 9), 3GPP Standard; 3GPP TS 23.272, Valbonne, France, V9.3.0, Mar. 2010, 66 pages.

3rd Generation Partnership Project; Technical Specification Group Service and System Aspects; Architectural requirements (Release 9), 3GPP Standard, 3GPP TS 23.221, Valbonne, France, V9.3.0, Mar. 2010, 47 pages.

3rd Generation Partnership Project; Technical Specification Group Core Network and Terminals; Mobile readio interface Layer 3 specification; Core network protocols; Stage 3 (Release 9), 3GPP Standard; 3GPP TS 24.008, Valbonne, France, V9.2.0, Mar. 2010, 605 pages.

3rd Generation Partnership Project; Technical Specification Group Terminals; Application and User interaction in the UE-Principles and specific requirements (Release 5), 3GPP Standard; 3GPP TS 23.227, Valbonne, France, V5.1.0, Mar. 2002, 13 pages.

3rd Generation Partnership Project; Technical Specification Group Core Network and Terminals; Non-Access-Stratum.(NAS) functions related to Mobile Station (MS) in idle mode (Release 9), 3GPP Standard; 3GPP TS 23.122, Valbonne, France, V9.2.0, Mar. 2010, 41 pages.

3rd Generation Partnership Project; Technical Specification Group Core Network and Terminals; Non-Access-Stratum.(NAS) protocol for Evolved Packet System (EPS); Stage 3 (Release 9), 3GPP Standard; 3GPP TS 24.301, Valbonne, France, V9.2.0, Mar. 2010, 293 pages.

3rd Generation Partnership Project; Technical Specification Group Radio Access Network; Evolved Universal Terrestrial Radio Access (E-UTRA); User Equipment (UE) procedures in idle mode (Release 9); 3GPP Standard; 3GPP TS 36.304, Valbonne, France, V9.2.0, Mar. 2010, 32 pages.

3rd Generation Partnership Project; Technical Specification Group Radio Access Network; User Equipment (UE) procedures in idle mode and procedures for cell reselection in connected mode (Release 9); 3GPP Standard; 3GPP TS 25.304, Valbonne, France, V9.1.0, Mar. 2010, 50 pages.

International Searching Authority, Preliminary Report on Patentability and Written Opinion issued in International Application No. PCT/US2011/039807, issued on Dec. 14, 2012, 7 pages.

United States Patent and Trademark Office, Non-Final Office Action, issued in connection with U.S. Appl. No. 13/244,744, on Dec. 9, 2011, 8 pages.

United States Patent and Trademark Office, Non-Final Office Action, issued in connection with U.S. Appl. No. 13/244,744, on Aug. 14, 2012, 12 pages.

United States Patent and Trademark Office, Final Rejection, issued in connection with U.S. Appl. No. 13/244,744, on May 24, 2012, 12 pages.

United States Patent and Trademark Office, Non-Final Office Action, issued in connection with U.S. Appl. No. 13/793,670, on Nov. 30, 2011, 15 pages.

United States Patent and Trademark Office, Non-Final Office Action, issued in connection with U.S. Appl. No. 13/793,670, on May 22, 2012, 21 pages.

United States Patent and Trademark Office, Non-Final Office Action, issued in connection with U.S. Appl. No. 13/244,721, on Nov. 15, 2011, 10 pages.

United States Patent and Trademark Office, Non-Final Office Action, issued in connection with U.S. Appl. No. 13/244,721, on Mar. 8, 2012, 11 pages.

United States Patent and Trademark Office, Notice of Allowance, issued in connection with U.S. Appl. No. 13/244,721, on May 17, 2012, 5 pages.

United States Patent and Trademark Office, "Non-Final Office Action," issued in connection with U.S. Appl. No. 12/793,673, on Jul. 17, 2012, 30 pages.

United States Patent and Trademark Office, Notice of Allowance, issued in connection with U.S. Appl. No. 12/793,673, on Feb. 11, 2013, 14 pages.

United States Patent and Trademark Office, Non-Final Office Action, issued in connection with U.S. Appl. No. 13/244,728, on Feb. 25, 2013, 27 pages.

United States Patent and Trademark Office, Non-Final Office Action, issued in connection with U.S. Appl. No. 13/244,728, on Dec. 8, 2011, 10 pages.

United States Patent and Trademark Office, Final Rejection, issued in connection with U.S. Appl. No. 13/244,728, on May 29, 2012, 15 pages.

United States Patent and Trademark Office, Non-Final Office Action, issued in connection with U.S. Appl. No. 13/793,668, on May 29, 2012, 28 pages.

(56) References Cited

OTHER PUBLICATIONS

United States Patent and Trademark Office, Final Rejection, issued in connection with U.S. Appl. No. 13/793,668, on Dec. 20, 2012, 40 pages.
United States Patent and Trademark Office, Non-Final Office Action, issued in connection with U.S. Appl. No. 12/828,746, on Sep. 24, 2012, 24 pages.
Institute of Mexican Industrial Property, Office Action, issued in connection with MX patent application No. MX/a/20111012978, on Apr. 19, 2013, 2 pages.
Intellectual Property Office of Singapore, Notification of Grant, issued in connection with in SG patent application No. 201108728-5, on Nov. 30, 2012, 2 pages.
Australian Patent Office, Patent Examination Report No. 1, issued in connection with AU patent application No. 2010256525, on May 17, 2013, 2 pages.
Intellectual Property Office of Japan, Notice of Reasons for Rejection, issued in connection with JP patent application No. 2012-514159, on Jan. 15, 2013, 6 pages.
Intellectual Property Office of Japan, Notice of Reasons for Rejection, issued in connection with JP patent application No. 2012-514161, on Jan. 22, 2013, 6 pages.
Intellectual Property Office of Japan, Notice of Reasons for Rejection, issued in connection with JP patent application No. 2012-514162, on May 20, 2013, 7 pages.
Patent Coorporation Treaty, International Bureau, International Preliminary Report on Patentability, issued in connection with PCT patent application No. PCT/US2010/037339, on Dec. 15, 2011, 7 pages.
Patent Coorporation Treaty, International Bureau, International Preliminary Report on Patentability, issued in connection with PCT patent application No. PCT/US2010/037340, on Dec. 15, 2011, 10 pages.
Patent Coorporation Treaty, International Bureau, International Preliminary Report on Patentability, issued in connection with PCT patent application No. PCT/US2010/040740, on Jan. 12, 2012, 8 pages.
Patent Coorporation Treaty, International Bureau, International Preliminary Report on Patentability, issued in connection with PCT patent application No. PCT/US2010/07336, on Dec. 15, 2011, 8 pages.
Patent Coorporation Treaty, International Searching Authority, International Search Report, issued in connection with PCT/US2010/037340, on Jan. 3, 2011, 5 pages.
Patent Coorporation Treaty, International Searching Authority, Written Opinion of the International Searching Authority, issued in connection with PCT/US2010/037340, Jan. 3, 2011, 8 pages.
Patent Coorporation Treaty, International Searching Authority, International Search Report, issued in connection with PCT/US2010/037336, on Oct. 28, 2010, 3 pages.
Patent Coorporation Treaty, International Searching Authority, Written Opinion of the International Searching Authority, issued in connection with PCT/US2010/037336, on Oct. 28, 2010, 6 pages.
United States Patent and Trademark Office, Notice of Allowance, issued in connection with U.S. Appl. No. 12/828,746, on Feb. 28, 2013, 15 pages.
United States Patent and Trademark Office, Final Office Action, issued in connection with U.S. Appl. No. 13/244,744, on Mar. 28, 2013, 36 pages.
Canadian Intellectual Property Office, Office Action, issued in connection with application No. CA 2,764,459, on Oct. 1, 2013, 3 pages.
Intellectual Property Office of Japan, Notice of Reasons for Rejection, issued in connection with application No. JP 2012-514159, on Aug. 19, 2013, 7 pages.
Korean Intellectual Property Office, Office Action, issued in connection with application No. KR 10-2012-7000068, on Jul. 31, 2013, 9 pages.
International Bureau, International Preliminary Report on Patentability, issued in connection with No. PCT/US2010/037337, mailed on Dec. 15, 2011, 7 pages.
International Searching Authority, International Search Report and Written Opinion, issued in connection with PCT/US20101037337, mailed on Nov. 3, 2010, 8 pages.
United States Patent and Trademark Office, Final Office Action, issued in connection with U.S. Appl. No. 13/244,728, on Aug. 14, 2013, 33 pages.
IP Australia, Patent Examination Report No. 1, issued in connection with application No. AU 2010256524, on May 2013, 3 pages.
Canadian Intellectual Property Office, Office Action, issued in connection with application No. CA 2,764,455, on Sep. 27, 2013, 3 pages.
Japanese Patent Office, Notice of Reasons for Rejection, issued in connection with application No. JP 2012-514158, on Jun. 25, 2013, 6 pages.
Korean Intellectual Property Office, Office Action, issued in connection with application No. KR 10-2012-7000060, on Jul. 31, 2013, 11 pages.
International Searching Authority, International Search Report, issued in connection with PCT/US2010/040740, mailed on Oct. 14, 2010, 5 pages.
International Searching Authority, Written Opinion of the International Searching Authority, issued in connection with PCT/US2010/040740, mailed on Oct. 14, 2010, 8 pages.
IP Australia, Patent Examination Report No. 1, issued in connection with application No. AU 2010254797, on May 22, 2013, 3 pages.
Korean Intellectual Property Office, Office Action, issued in connection with application No. KR 10-2012-7000069, on Jul. 31, 2013, 8 pages.
Institute of Mexican Industrial Property, Notice of Allowance, issued in connection with application No. MX/a/2011/012978, on Aug. 23, 2013, 1 page.
International Searching Authority, International Search Report and Written Opinion, issued in connection with PCT/US2010/037339, mailed on Oct. 20, 2010, 8 pages.
IP Australia, Patent Examination Report No. 1, issued in connection with application No. AU 2010254798, on May 2013, 4 pages.
Korean Intellectual Property Office, Office Action with translation, issued in connection with application No. KR 10-2012-7000070, on Jun. 28, 2013, 7 pages.
International Searching Authority, Invitation to Pay Additional Fees and Partial International Search, issued in connection with PCT/US2010/037340, mailed on Oct. 29, 2010, 7 pages.
3rd Generation Partnership Project; Technical Specification Group Core Network and Terminals; Non-Access-Stratum (NAS) protocol for Evolved Packet System (EPS); Stage 3 (Release 8); 3GPP Standard; 3GPP TS 24.301, Valbonne, France, V8.1.0, Mar. 2009, 250 pages.
3rd Generation Partnership Project; Technical Specification Group Core Network and Terminals; Mobile radio interface Layer 3 specification; Core network protocols; Stage 3 (Release 8); 3GPP Standard; 3GPP TS 24.008, Valbonne, France, V8-5.0, Mar. 2009, 581 pages.
3rd Generation Partnership Project; Technical Specification Group Core Network and Terminals; IP multimedia call control protocol based on Session Initiation Protocol (SIP) and Session Description Protocol (SOP); Stage 3 (Release 8); 3GPP Standard; 3GPP TS 24.229, V8.7.0, Mar. 2009, 660 pages.
3rd Generation Partnership Project; Technical Specification Group Radio Access Network; Evolved Universal Terrestrial Radio Access (E-UTRA); User Equipment (UE) procedures in idle mode (Release 8); 3GPP Standard; 3GPP TS 36.304, Valbonne, France, V8.5.0, Mar. 2009, 30 pages.
3rd Generation Partnership Project; Technical Specification Group Radio Access Network; Radio Resource Control (RRC); Protocol Specification (Release 8); 3GPP Standard; 3GPP TS 25.331, Valbonne, France, V8.6.0, Mar. 2009, 1673 pages.
3rd Generation Partnership Project; Technical Specification Group Radio Access Network; User Equipment (UE) procedures in idle mode and procedures for cell reselection in connected mode (Release 8); 3GPP Standard; 3GPP TS 25.304, Valbonne, France, V8.5.0, Mar. 2009, 49 pages.
3rd Generation Partnership Project Technical Specification Group Services and System Aspects General Packet Radio Service (GPRS)

(56) References Cited

OTHER PUBLICATIONS enchancements for Evolved Universal Terrestrial Radio Access Network (E-UTRAN) access (Release 9); 3GPP Standard; 3GPP TS 23.401, Valbonne, France, V9.1.0, Jun. 2009, 238 pages.
Nokia Siemens Networks et al: Introduction of Voice over IMS session support indication; 3GPP Draft; C1-092867-VOIMS-24301-821, 3rd Generation Partnership Project (3GPP); Mobile Competence Centre; 650, Route Des Lucioles; F-06921 Sophia-Antipolis Cedex; France; no. Los Angeles; Jun. 22-26, 2009, 15 pages.
Nokia Siemens Networks: Introduction of Voice over IMS session support indication; 3GPP Draft; C1-092353-VOIMS-24301-821, 3rd Generation Partnership Project (3GPP); Mobile Competence Centre; 650, Route Des Lucioles; F-06921 Sophia-Antipolis Cedex; France; no. Los Angeles; Jun. 26, 2009, 15 pages.
Nokia Siemens Networks et al: Introduction of Voice over IMS session support indication; 3GPP Draft; C1-092354-VOIMS-24008-860, 3rd Generation Partnership Project (3GPP); Mobile Competence Centre; 650, Route Des Lucioles; F-06921 Sophia-Antipolis Cedex; France; no. Los Angeles; Jun. 26, 2009, 14 pages.
SA2: LS on Principles for voice domain selection; 3GPP Draft; R2-093649_S2-094238, 3rd Generation Partnership Project (3GPP); Mobile Competence Centre; 650, Route Des Lucioles; F-06921 Sophia-Antipolis Cedex; France; no. Los Angeles; Jun. 29, 2009, 2 pages.
Motorola: Approaches to stop CS/PS Mode 1 UE from HO to non-CSFB LTE; 3GPP Draft; TD S2-093264, 3rd Generation Partnership Project (3GPP); Tallinn; May 11-15, 2009, 2 pages.
Ericsson: CS domain and IM CN Subsystem selection principles; 3GPP Change Request; S2094178, 3rd Generation Partnership Project (3GPP), 23.221 CR 0065, rev 8; Los Angeles, V8.3.0, May 11-15, 2009, 10 pages.
CT1: "Response LS on CS domain and IM CN subsystem selection principles" Apr. 27, 2009; 3GPP Draft,C1-092262, 3GPP Mobile Competence Centre; 650, Route Des Lucioles; F-06921 Sophia-Antipolis Cedex; France, XP050337399, 5 pages.
NEC: "Discussion on CS/PS modes of operation and interactions with AS" Apr. 20-24, 2009, 3GPP Draft;C1-091801, 3GPP Mobile Competence Contre; 650, Route Des Lucioles; F-06921 Sophia-Antipolis Cedex; France, XP050337399, 3 pages.
Nokia Siemens Networks et al: "Handling of CS/PS Mode Selection" 3GPP Draft; R2-092998 (CSFB Mode), 3GPP Mobile Competence Centre; 650, Route Des Lucioles; F-06921 Sophia-Antipolis Cedex; France, no. San Francisco, USA; May 4-8, 2009, 6 pages.
NIT Docomo et al: "CS/PS mode of operation" 3GPP Draft; R2-093270 CS-PS Mode, 3GPP, Mobile Competence Centre; 650, Route Des Lucioles, F-06921 Sophia-Antipolis Cedex; France, no. San Francisco, USA; May 4-8, 2009, 4 pages.
T-Mobile: "Voice mode selection for CSS Fallback and IMS" May 11, 2009, pp. 1-6, XP002604555 3GPP TSG SA WG2 Meeting 73, Tallinn, Estonia Retrieved from the Internet: URL: http:/fwww.3gpp.com/ftp/tsg_sa/WG2_Arch!TSGS2_73_Tallinn/docs/S2-093814.zip, pp. 1-6.
SA2: LS on Principles for voice domain selection; 3GPP Draft; TD S2-094238, 3rd Generation Partnership Project (3GPP); Tallinn; May 11-15, 2009, 2 pages.
Motorola: MS Voice Session Supported Indication; 3GPP Change Request; TD S2-094147, 3rd Generation Partnership Project (3GPP), 23.060 CR 0824, rev 5; Tallin, V8.4.0, May 11-15, 2009, 45 pages.
Nokia Siemens Networks, Nokia: IMS voice Indication; 3GPP Change Request; S2-094179, 3rd Generation Partnership Project (3GPP), 23.401 CR 0996, rev 4; Tallinn, V8.5.0, May 11-15, 2009, 20 pages.
3rd Generation Partnership Project; Technical Specification Group Services and System Aspects; General Packet Radio Service (GPRS); Service description; Stage 2 (Release 9); 3GPP Standard; 3GPP TS 23.060, Valbonne, France, V9.1.1, Jun. 2009, 289 pages.
3rd Generation Partnership Project; Technical Specification Group Services and System Aspects; General Packet Radio Service (GPRS); Service description; Stage 2 (Release 8); 3GPP Standard; 3GPP TS 23.060, Valbonne, France, V8.5.1, Jun. 2009, 281 pages.
3rd Generation Partnership Project; Technical Specification Group Services and System Aspects; Architectural requirements (Release 8); 3GPP Standard; 3GPP TS 23.221, Valbonne, France, V8.4.0, Jun. 2009, 46 pages.
3rd Generation Partnership Project; Technical Specification Group Radio Access Network; Evolved Universal Terrestrial Radio Access (E-UTRA) Radio Resource Control (RRC); Protocol specification (Release 8); 3GPP Standard; 3GPP TS 36.331, Valbonne, France, V8.5.0, Mar. 2009, 204 pages.
3rd Generation Partnership Project; Technical Specification Group Radio Access Network; Evolved Universal Terrestrial Radio Access (E-UTRA); Radio Resource Control (RRC); Protocol specification (Release 8); 3GPP Standard; 3GPP TS 36.331, Valbonne, France, V8.6.0, Jun. 2009, 207 pages.
3rd Generation Partnership Project Technical Specification Group Services and System Aspects General Packet Radio Service (GPRS) enchancements for Evolved Universal Terrestrial Radio Access Network (E-UTRAN) access (Release 8); 3GPP Standard; 3GPP TS 23.401, Valbonne, France, V8.6.0, Jun. 2009, 227 pages.
Korean Intellectual Property Office, "Notice of Allowance," issued in connection with application No. KR 10-2012-7000069, on Mar. 21, 2014, 3 pages.
IP Australia, "Notice of Acceptance," issued in connection with application No. AU2010254797, on Apr. 3, 2014, 2 pages.
European Patent Office, "Examination Report," issued in connection with application No. EP11728459.6, on Mar. 25, 2014, 4 pages.
United States Patent and Trademark Office, "Non-Final Office Action," issued in connection with U.S. Appl. No. 13/244,728, on Dec. 31, 2013, 52 pages.
United States Patent and Trademark Office, "Notice of Allowance," issued in connection with U.S. Appl. No. 12/828,746, on Mar. 17, 2014, 31 pages.
Canadian Intellectual Property Office, "Office Action," issued in connection with application No. CA 2,764,460, on Dec. 20, 2013, 3 pages.
Canadian Intellectual Property Office, "Office Action," issued in connection with application No. CA2,764,462, on Dec. 23, 2013, 3 pages.

* cited by examiner

METHODS AND APPARATUS FOR VOICE DOMAIN OPERATION

FIELD OF THE DISCLOSURE

This disclosure relates generally to mobile communications and, more particularly, to methods and apparatus for voice domain operation.

BACKGROUND

User equipment (UE) operating in a voice-centric operating mode will connect to network facilities to provide voice services. For example, UE may attempt to connect to long term evolution (LTE) network coverage to obtain voice services and, if voice services are unavailable, may reselect to second or third generation (2G/3G) network coverage.

DETAILED DESCRIPTION

Figure 1:
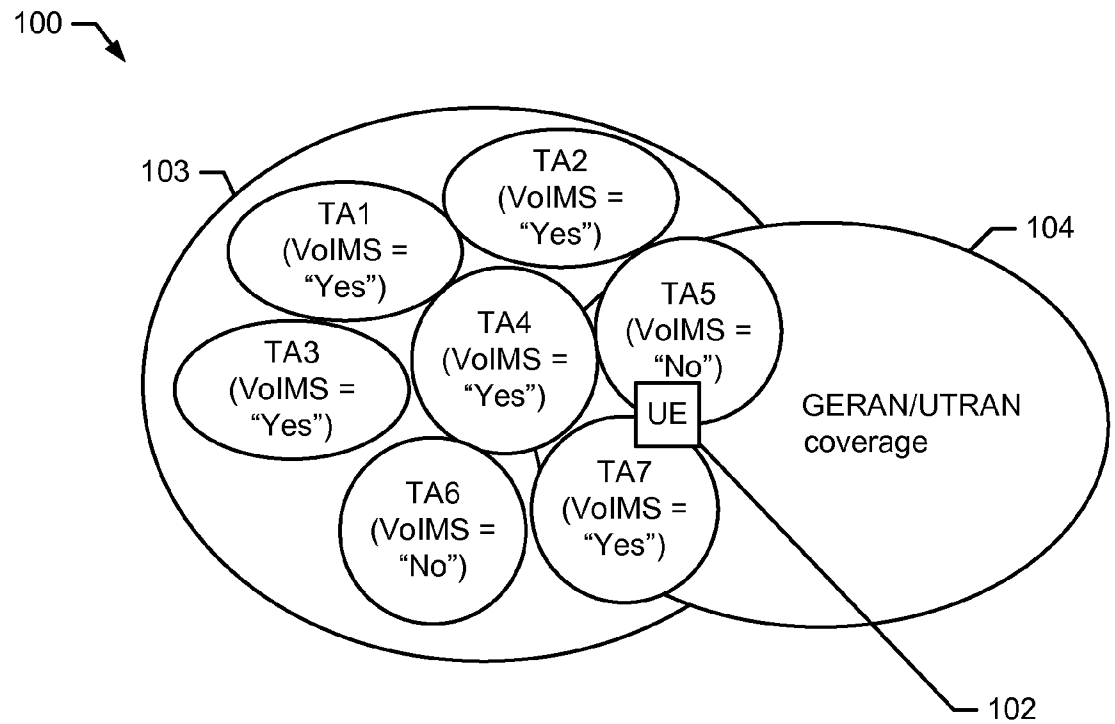
FIG. 1 is a block diagram of a communication network in which UE may operate.

The methods and apparatus herein are described in conjunction with various UE usage settings, which are also referred to as home public land mobile network (HPLMN) operator preferences. The UE usage settings are provided to the UE by the network operator to specify how a UE that is both circuit-switched fallback (CSFB) capable and internet multimedia subsystem (IMS) capable is supposed to handle voice services. Example usage settings are described below.

In the circuit-switched (CS) voice only usage setting, the UE will use only the CS domain (possibly using IMS signaling, per 3GPP TS 23.292) to originate voice calls and the UE will not attempt to initiate voice sessions over IMS using a packet switched (PS) bearer.

In the CS Voice preferred, IMS PS Voice as secondary usage setting, if CS voice is available the UE will use the CS domain (possibly using IMS signaling, see 3GPP TS 23.292) to originate and terminate voice calls. The UE attempts combined evolved packet system/international mobile subscriber identity (EPS/IMSI) attach or combined tracking area/location area (TA/LA) Update procedures (as per 3GPP TS 23.272). If combined EPS/IMSI attach or combined TA/LA Update procedures fail to register the IMSI in the CS domain or succeed with a small message only “SMS-only” indication or succeed with a “CSFB Not Preferred” indication, the UE attempts to use voice over IMS to originate voice calls. If the UE fails to use IMS for voice e.g. due to “IMS voice over PS session supported indication” indicates voice is not supported, the UE behaves as described for “voice centric” or “data centric” according to its setting.

In the IMS PS Voice preferred, CS Voice as secondary usage setting, if IMS voice is available the UE will use IMS to originate and terminate voice sessions. The UE may attempt combined EPS/IMSI attach with or without “SMS only,” combined TA/LA Update with or without “SMS only” or EPS attach/tracking area update (TAU) procedures. If the UE fails to use IMS for voice, e.g. due to “IMS voice over PS session supported indication” indicates voice is not supported (in Attach accept or subsequent TAU accept), then the UE uses the CS domain (as defined in 3GPP TS 23.272), possibly using IMS signaling (see 3GPP TS 23.292). If not already performed, the UE attempts combined TA/LA Update procedures. If the combined TA/LA Update procedures fail to register the IMSI in the CS domain or succeed with an “SMS-only” indication or succeed with a “CSFB Not Preferred” indication and the UE has failed to use IMS for voice, the UE behaves as described for “voice centric” or “data centric” according to its setting.

In the IMS PS Voice only usage setting, the UE will use IMS to originate voice sessions and will not attempt CS Voice. The UE may attempt combined EPS/IMSI attach with “SMS only,” combined TA/LA Update with “SMS only” or EPS attach/TAU. If the UE fails to use IMS for voice (e.g. due to “IMS voice over PS session supported indication” indicates voice is not supported on an evolved UMTS Terrestrial Radio Access Network (E-UTRAN), the UE behaves as described for “voice-centric” or “data-centric” according to its setting.

Methods and apparatus for voice domain operation are described herein. One example method includes determining that an LTE network (e.g., E-UTRAN) is not preferred for voice service provision; storing an identification of the LTE network that is not preferred for voice service provision; and accessing the stored identification of the LTE network that is not preferred for voice service provision.

As described herein, when UE decides that it will not register to a particular LTE network, the UE stores an indication of that LTE network. That stored information is later used by the UE when selecting or reselecting an LTE network to avoid selection of an LTE network that was previously not desired.

FIG. 1 is a block diagram of a communication system 100 in which a UE 102 may operate. The example communication system 100 includes a several tracking areas TA1-TA7 that each comprises one or more cells (not shown) to form an LTE network of coverage 103. The tracking areas TA1-TA7 could alternatively be routing areas (RAs) or LAs. The tracking areas TA1-TA7 are associated with each other by their identification on a tracking area identity (TAI) list that may be provided to the UE 102 by a mobility manager or any other network component. As shown in the example communication system 100, the tracking areas TA1-TA7 on a TAI list may not support all of the same services. For example, tracking areas TA5 and TA6 do not support voice over internet multimedia subsystem (VoIMS) while tracking areas TA1-TA4, and TA7 support VoIMS.

Additionally, all or parts of some of the tracking areas (e.g., TA4, TA5, and TA7) may overlap with different network coverage 104. The network coverage 104 may be provided by 2G and/or 3G network technology, such as, for example, Global Systems for Mobile enhanced data rates for GSM evolution (EDGE) radio access network (GERAN), Universal Mobile Telecommunications System radio access network (UTRAN), etc.

When the UE 102 first connects with the LTE coverage 103 (e.g., inside tracking area TA5), the UE 102 initiates a registration procedure to a network the UE 102 has designated as having a high priority. The registration procedure and be an ATTACH procedure, a tracking area update (TAU), a combined ATTACH, or a combined TAU. In response to the registration procedure, the UE 102 receives a response when the LTE coverage 103 has agreed to initiate a connection with the UE 102. The response includes an indication of the support capabilities of the tracking area in which the UE 102 is located (e.g., tracking area TA5).

Of course, a particular tracking area may not provide all the services needed or preferred by the UE 102. For example, the UE 102 may be a voice-centric UE that prefers voice service (e.g., VoIMS). Thus, when the UE 102 accesses TA5, it discovers that VoIMS is not supported by TA5 and will find that TA5 is not a preferred network for the provision of voice services because it cannot provide the services needed by the UE 102. As explained below, the UE 102 will remember that TA5 is not a preferred network for voice services provision and will use the remembered information in the future to avoid attempting to establish communications with TA5 to obtain voice services. For example, 3GPP documents S2-094238, S2-094147, C1-092354, S2-094179, C1-092353, C1-092354, and C1-092867 describe example implementations of indications of VoIMS support that may be provided to the UE 102. Having failed to obtain the desired services from the LTE coverage 103 via TA5, the UE 102 will fail over to the 2G/3G coverage 104 in an attempt to obtain voice services.

If voice services are not available from the 2G/3G coverage 104, the UE 102 may again attempt to obtain voice services from the LTE coverage 103, but will recall that TA5 is not preferred for voice services provision because of the failed prior attempt to obtain voice services from TA5 and will, therefore, de-prioritize TA5 and may attempt to obtain voice services from TA7. As shown in the example of FIG. 1, TA7 is capable of providing VoIMS and, therefore, the UE 102 will connect to, and obtain voice services from, TA7.

In another example, if the UE 102 attempts to obtain voice services from LTE coverage 103 and is unable to do so, the UE 102 then tries to obtain voice services from 2G/3G coverage 104. If the UE 102 is unable to obtain voice services from 2G/3G coverage 104, the UE 102 may access the LTE coverage 103 and accept services that do not include voice services.

Alternatively, as explained below, if the UE 102 obtains voice services from the 2G/3G coverage 104, the UE 102 may periodically scan for high priority networks to provide services needed by the UE 102. In conducting these periodic scans, the UE 102 recalls the TAs that are not preferred for voice services provision to avoid delays in obtaining services from a network that can provide the preferred voice service.

Figure 2:
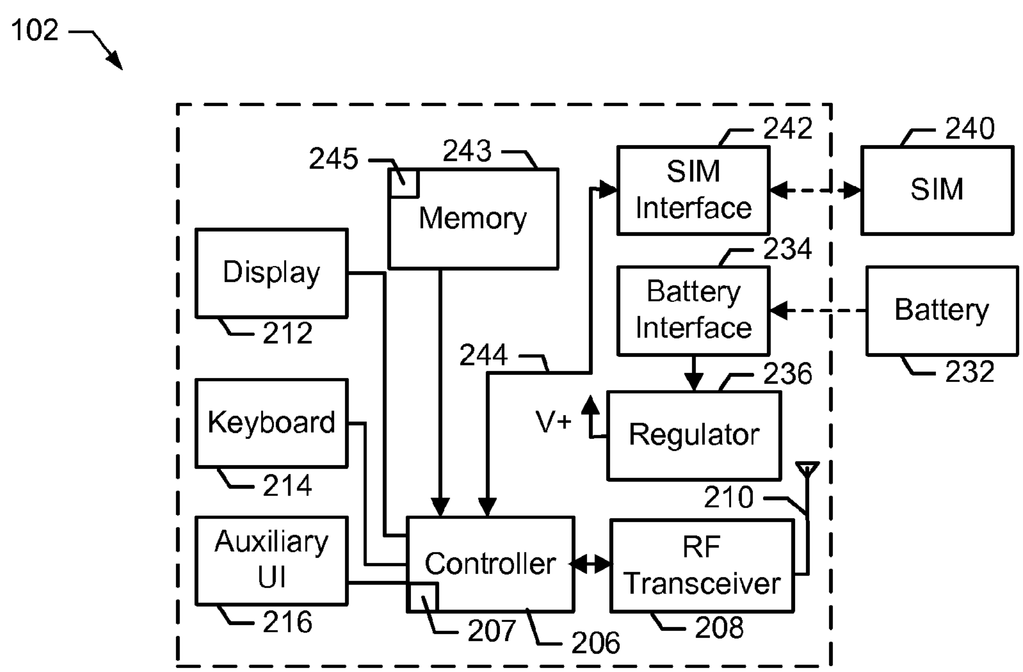
FIG. 2 is a block diagram of an example UE.

FIG. 2 shows further detail of one example UE 102, which may also be referred to as a mobile station (MS). The example UE 102 includes a visual display 212, a keyboard 214, and perhaps one or more auxiliary user interfaces (UI) 216, each of which is coupled to a controller 206. The controller 206 includes a connection manager 207 that, as described in detail below, controls the connections the UE 102 makes with one or more networks (e.g., LTE networks, 2G/3G networks, etc.). Example methods and apparatus to implement the connection manager 207 are described in conjunction with FIGS. 3-6.

The controller 206 is also coupled to a radio frequency (RF) transceiver circuitry 208, which is further coupled to an antenna 210. In one example, the controller 206 is implemented using a central processing unit (CPU) that runs operating system software stored in a memory 243. The memory 243 also stores information (e.g., a list) identifying public land mobile networks (PLMNs) and/or TAs of networks that are non-preferred for voice service provision, which may be referred to as a "non-preferred TAs for voice service" list 245. The designation of "non-preferred" is representative of one network or TA being less preferable to other networks or TAs through which voice service may be provisioned. In one example, an LTE network through which voice service is not available is "non-preferred."

As explained below, the list 245 stores information that the UE 102 may use to avoid attempting network connections that will not provide voice services. The controller 206 will normally control overall operation of UE 102, whereas signal processing operations associated with communication functions are typically performed by the RF transceiver circuitry 208. The controller 206 interfaces with the display 212 to present received information, stored information, user inputs, and the like.

The keyboard 214, which may be a telephone type keypad or full alphanumeric keyboard, is normally provided for entering data for storage in the UE 102, information for transmission to a network, a telephone number to place a telephone call, commands to be executed on the UE 102, and possibly other or different user inputs.

The UE 102 sends communication signals to, and receives communication signals from the networks (e.g., the LTE coverage 103 and/or the 2G/3G coverage 104) over a wireless link via the antenna 210. The RF transceiver circuitry 208 performs, for example, modulation/demodulation, encoding/decoding, and encryption/decryption. The RF transceiver circuitry 208 is adapted to particular wireless coverage or coverages (e.g., LTE, 2G, 3G, etc.) in which UE 102 is intended to operate.

The UE 102 further includes a battery interface 234 for receiving one or more rechargeable batteries 232. The battery 232 provides power to electrical circuitry in UE 102, and the battery interface 234 provides for a mechanical and electrical connection for the battery 232. The battery interface 234 is coupled to a regulator 236 that regulates power V+ to the device. When the UE 102 is operational, an RF transmitter of the RF transceiver circuitry 208 is typically keyed or turned on only when it is sending information to the network, and is otherwise turned off to conserve resources. Similarly, an RF receiver of the RF transceiver circuitry 208 is typically periodically turned off to conserve power until it is needed to receive signals or information (if at all) during designated time periods.

The UE 102 operates using a Subscriber Identity Module (SIM) 240 that is connected to or inserted in the UE 102 at a SIM interface 242. Without the SIM 240, the UE 102 may be referred to as mobile equipment (ME); with the SIM 240, the UE 102 may be referred to as user equipment (UE). The SIM 240 is one type of a removable memory module or smart card used to identify an end user of UE 102 (or subscriber) and to personalize the device, among other things. Without the SIM 240, the example UE 102 is not fully operational for communication through the wireless communication network 204. By inserting the SIM 240 into the UE 102, an end user can have access to any and all of his/her subscribed services.

The SIM 240 generally includes a processor and memory for storing information. Because the SIM 240 is coupled to the SIM interface 242, it is coupled to the controller 206 through communication lines 244. To identify the subscriber, the SIM 240 contains some user parameters such as an International Mobile Subscriber Identity (IMSI). An advantage of using the SIM 240 is that end users are not necessarily bound by any single physical mobile station because the SIM 240 may be used in any number of different mobile stations. The SIM 240 may store additional user information for the UE 102 as well, including datebook (or calendar) information, recent call information, and network connection information. While the list 245 was shown as being stored in the memory 243, the list may be stored in the SIM 240, or in any other suitable location.

The UE 102 may be a single unit, such as a data communication device, a cellular telephone, a multiple-function communication device with data (e.g., electronic mail, internet access, personal information management, etc.) and voice communication capabilities, a personal digital assistant (PDA) enabled for wireless communication, or a computer incorporating an internal modem. Alternatively, the UE 102 may be a multiple-module unit comprising a plurality of separate components, including but in no way limited to a computer or other device connected to a wireless modem. In particular, for example, in the mobile station block diagram of FIG. 2, the RF transceiver circuitry 208 and antenna 210 may be implemented as a radio modem unit that may be inserted into a port on a laptop computer. In this case, the laptop computer would include the display 212, keyboard 214, one or more auxiliary UIs 216, and the controller 206 may be the computer's CPU. It is also contemplated that a computer or other equipment not normally capable of wireless communication may be adapted to connect to and effectively assume control of the RF transceiver circuitry 208 and the antenna 210 of a single-unit device such as one of those described above.

The UE 102 communicates in and through the wireless communication networks, which may be a cellular telecommunications networks. As described above in conjunction with FIG. 1, the wireless networks may be configured in accordance with the LTE technology, 2G technology, 3G technology, or any other suitable technology. The wireless networks may be configured according to any communication technology including, for example, universal mobile telecommunications system (UMTS), worldwide interoperability for microwave access (WiMAX), code division multiple access (CDMA), General Packet Radio Service (GPRS), Global Systems for Mobile (GSM), enhanced data rates for GSM evolution (EDGE), GERAN, evolved UMTS Terrestrial Radio Access Network (E-UTRAN), etc.

In operation, the UE 102 makes its presence known to wireless networks by performing what is known as a registration procedure. As described above, the registration procedure and be an ATTACH procedure, a tracking area update (TAU), a combined ATTACH, or a combined TAU. This operation establishes a logical link between the UE 102 and the network(s) and makes the UE 102 available to receive, for example, pages via the networks, notifications of incoming data, SMS messages, etc. In order to send and receive data, the UE 102 assists in activating a packet data address that it wants to use. This operation makes the UE 102 known to a packet gateway within the core network; interworking with external data networks can thereafter commence. User data may be transferred transparently between the UE 102 and the external data networks using, for example, encapsulation and tunneling.

Block diagrams of apparatus and flowcharts representative of example processes that may be executed to implement some or all of the elements of the UE 102 are shown in FIGS. 3-6. In the following description, determining may be any type of process for identifying a particular result and is not limited to a computational or analysis process. For example, determining may involve reading an indicator, flag, register, variable, identifier, etc. to determine whether a service is supported. In another example, determining may involve querying, extracting, computing, calculating, etc. to determine a result.

Figure 3:
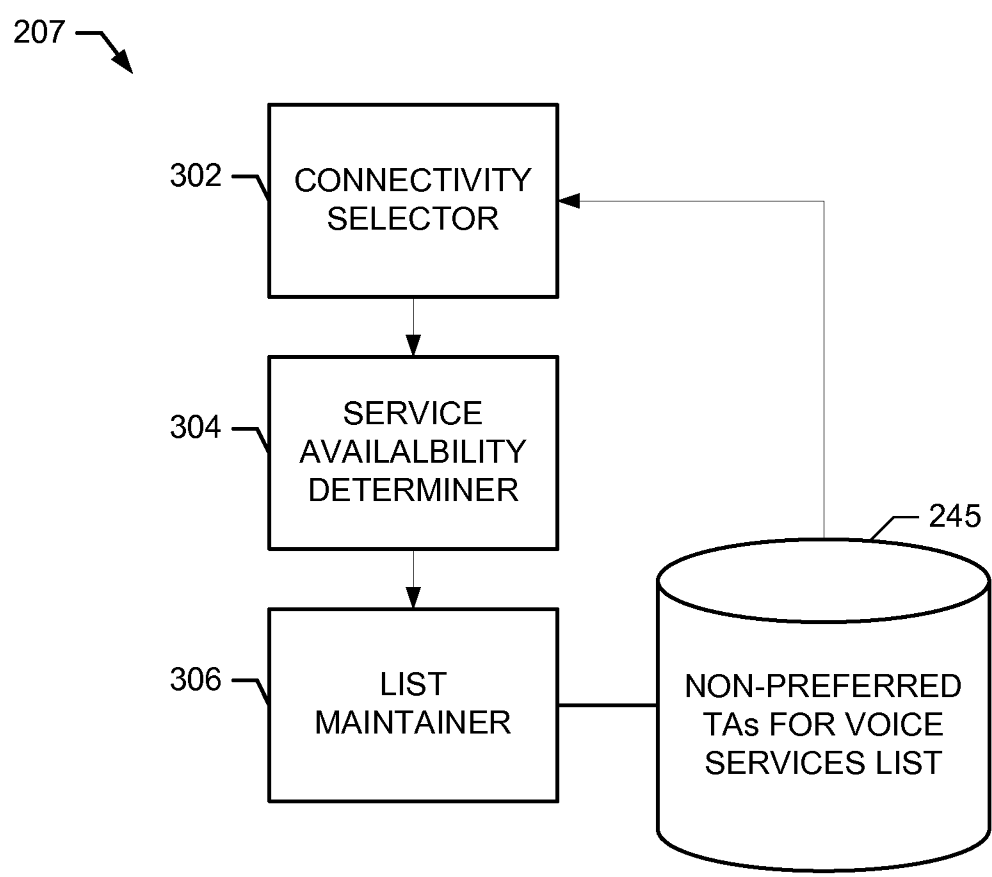
FIG. 3 is a block diagram of functionality that may be implemented in the UE of FIG. 2.

One example of a connection manager 207 that is shown in FIG. 3 includes a connectivity selector 302, a service availability determiner 304, and a list maintainer 306. FIG. 3 also shows the non-preferred TAs for voice services list 245, which may or may not form part of the connection manager 207, but may be used thereby.

The connectivity selector 302, the service availability determiner 304, and the list maintainer 306 may be implemented in a processor and/or may be implemented using any desired combination of hardware, firmware, and/or software. For example, one or more integrated circuits, discrete semiconductor components, and/or passive electronic components may be used. Thus, for example, the connectivity selector 302, the service availability determiner 304, and the list maintainer 306, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc. The connectivity selector 302, the service availability determiner 304, and the list maintainer 306, or parts thereof, may be implemented using instructions, code, and/or other software and/or firmware, etc. stored on a machine accessible medium and executable by, for example, a processor (e.g., the example processor 712). When any of the appended apparatus claims are read to cover a purely software implementation, at least one of the connectivity selector 302, the service availability determiner 304, and the list maintainer 306 is hereby expressly defined to include a tangible medium such as a solid state memory, a magnetic memory, a DVD, a CD, etc.

The connectivity selector 302 operates to select a network connection for the UE 102. For example, the connectivity selector 302 may read information from, for example, the SIM 240 and the list 245 and uses this information to select LTE coverage 103, and/or 2G/3G coverage 104. In one implementation, the SIM 240 may store a priority of networks from which the UE 102 is to seek connectivity, but the list 245 may store information indicating that one or more of those networks (e.g., PLMNs or TAs within those PLMNs) are not preferred for voice service provision.

The service availability determiner 304 evaluates information from the connectivity selector 302 to determine whether a necessary, desired, or preferred service is available from a particular network. For example, the connectivity selector 302 may attempt to obtain voice services from a particular LTE network TA (e.g., TA5 of FIG. 1), when voice services are not available from that particular LTE network TA. The service availability determiner 304 determines that such services, which were requested by the connectivity selector 302, are unavailable or not preferred. Such information is passed to the list maintainer 306.

The list maintainer 306 adds information to and removes information from the list 245. For example, when the service availability determiner 304 determines that a particular LTE TA cannot provide voice service, or that the TA is not preferred for voice service provisioning, the service availability determiner 304 informs the list maintainer 306 of the same so that the TAI's of the TAs that are not preferred for voice service provisioning can be added to the list 245, if the TAI's are not already stored in the list. In one example, if the TAI of the LTE TA or TAs in the TAI list that cannot provide voice service is or are already in the list 245, the previous listing of the TAI is refreshed by adding the TAI as a new entry in the list 245. For example, the UE 102 may have tried a first TA (e.g., TA5), which fails and the TAI of which is added to the list 245, and TAIs of the TAs in the TAI list that a mobility management entity (MME) returns to the UE 102 in the network registration are added to the list 245 if not already present. Subsequently, the UE 102 may try to register with a second TA (e.g., TA7), which is not on the list 245. In response to the registration from the UE 102, an MME returns a TAI list that also contains an indication of TA5. In this way, the indication of TA5 is refreshed in the list 245, and the TAI of each TA contained in the TAI list is also added to the list 245 if not already present. The MME can provide different TAI lists when the UE 102 attempts registration in a first TAx and in a second TAv, even if the TAI list provided by the MME pursuant to the EU registering to the network in TAx contains TAv, or when the TAI list provided in TAv contains TAx.

In this manner, the UE 102 can track networks (e.g., PLMNs) or network portions (e.g., TAs) with which the UE 102 decided previously not to register for any service so that this information can be used by the connectivity selector 302. Using this information, the connectivity selector 302 can avoid attempting network connections it knows cannot provision voice services in a preferred manner, thereby saving time and enhancing the user experience with the UE 102. Thus, the list 245 prevents repeated attempts of an evolved packet system capable (EPS-capable), voice centric UE 102 to get voice services from TAs from which the UE 102 previously tried and failed to get voice services.

The list maintainer 306 may update the list 245 at various intervals or upon various events or series of events. For example, the list maintainer 306 may update the list when: (1) the voice-centric UE 102 runs the voice domain selection process as defined in 3GPP TS 23.221 and concludes that voice services are not available in a TA and thus the UE 102 must disable LTE (e.g., E-UTRAN) capabilities and reselect to 2G/3G (e.g., GERAN/UTRAN) or (2) the UE 102 receives a reject cause #18 (circuit-switched domain available) when the UE 102 attempts to register for circuit-switched services when in S1 mode and voice domain preference of the UE 102 is "CS voice only."

More than one list may be maintained. For example, the list maintainer 306 of the UE 102 could maintain two or more lists. There may be one list that identifies non-preferred TAs for IMS Voice over PS, containing the TAs in which the UE 102 failed to obtain support for voice over IMS due to PS Voice over IMS not being supported. This list can nominally be termed "Non-preferred TAs for IMS voice over PS" list. There may also be another list identifies non-preferred TAs for circuit-switched fallback (CSFB) service, which contains the TAs in which the UE 102 failed to obtain CSFB service. This list can nominally be termed "Non-preferred TAs for CSFB" list. There may also be a list indicating TAs in which no voice service (e.g., either IMS or CSFB) is available. This list may be called "TAs with voice not available." Thus, different types of lists may have different types of specificity, ranging from specifying voice unavailability to the particular reasons for voice unavailability. Any desired combination of these lists may be used within the UE 102. The characteristics, maintenance and usage of these two lists will follow the principles described herein with respect to the list 245.

Figure 4:
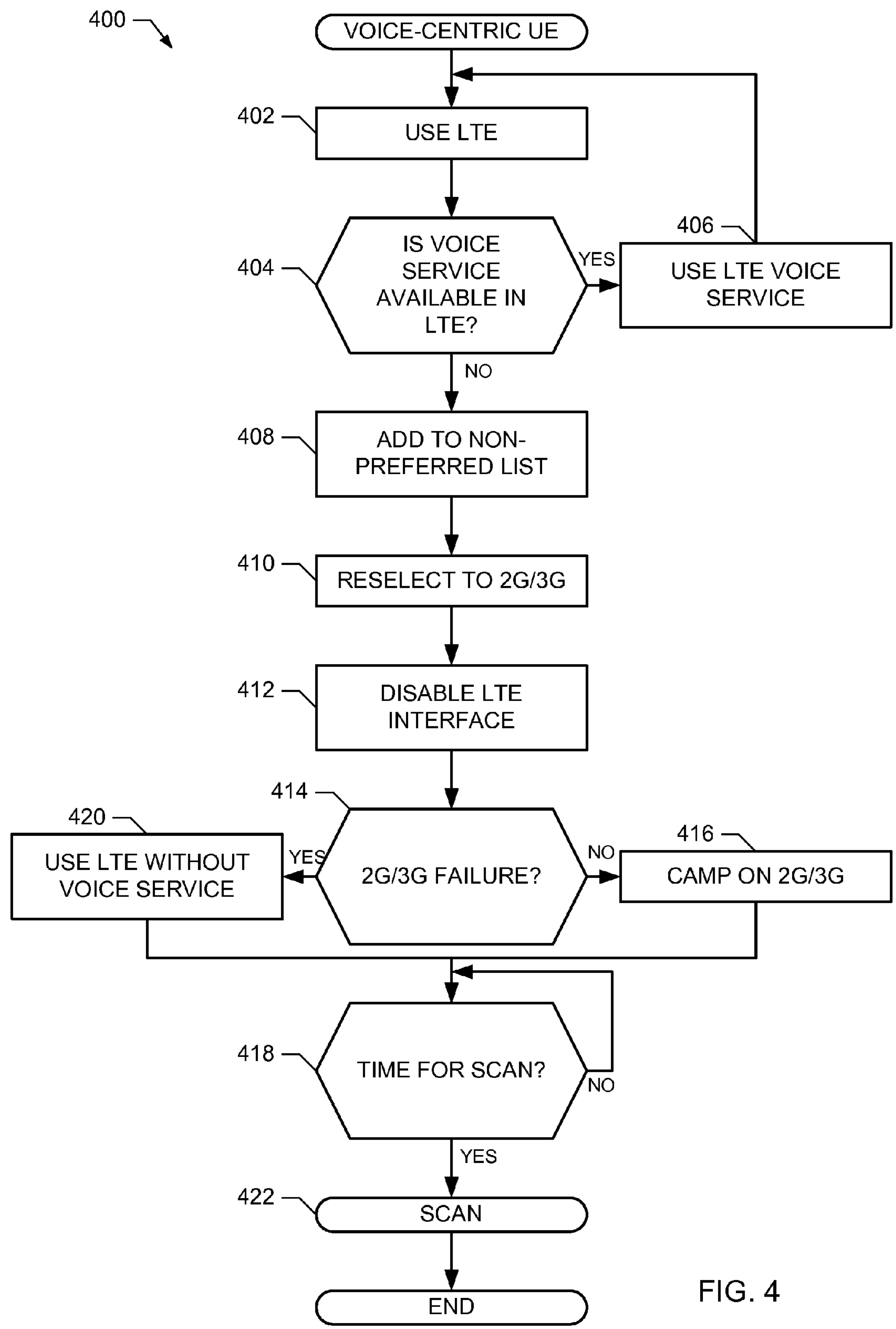
FIG. 4 is a flowchart of an example process that may be carried out by a voice-centric UE.
Figure 5:
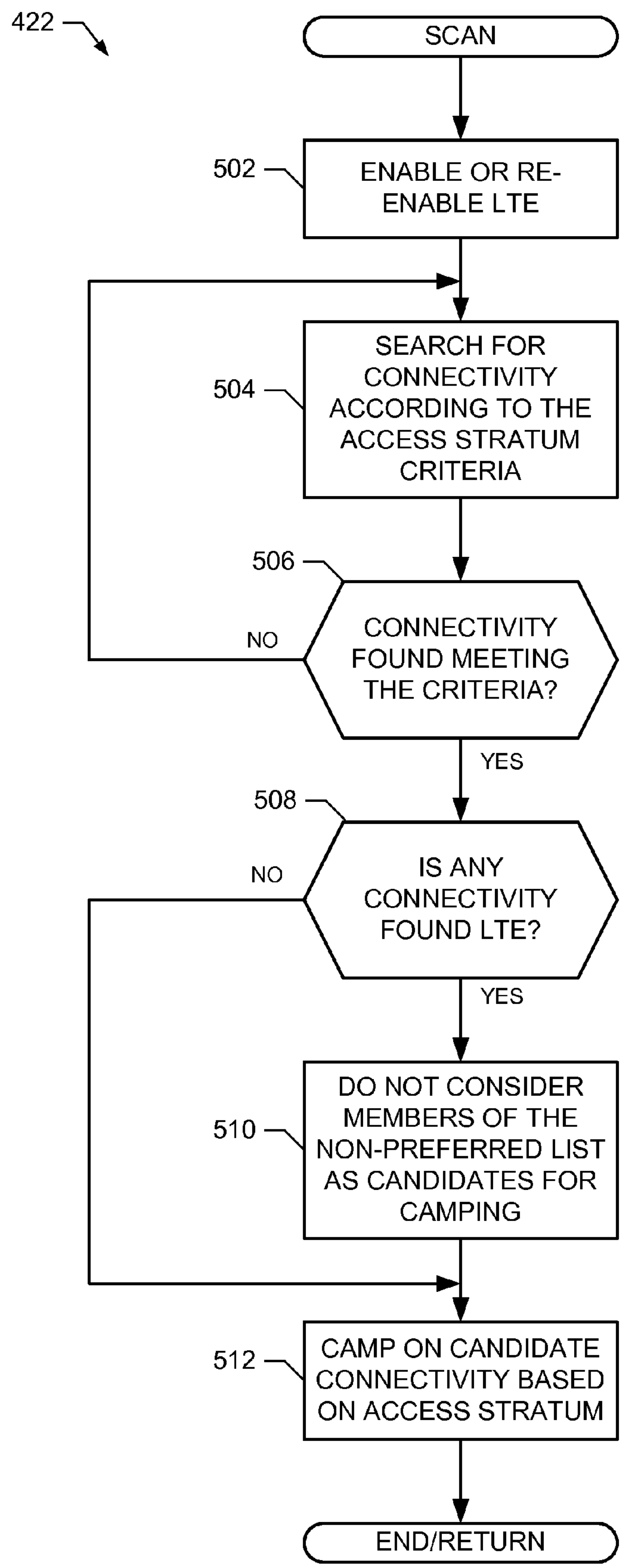
FIG. 5 is a flowchart of an example scan process that may be carried out by a voice-centric UE.
Figure 6:
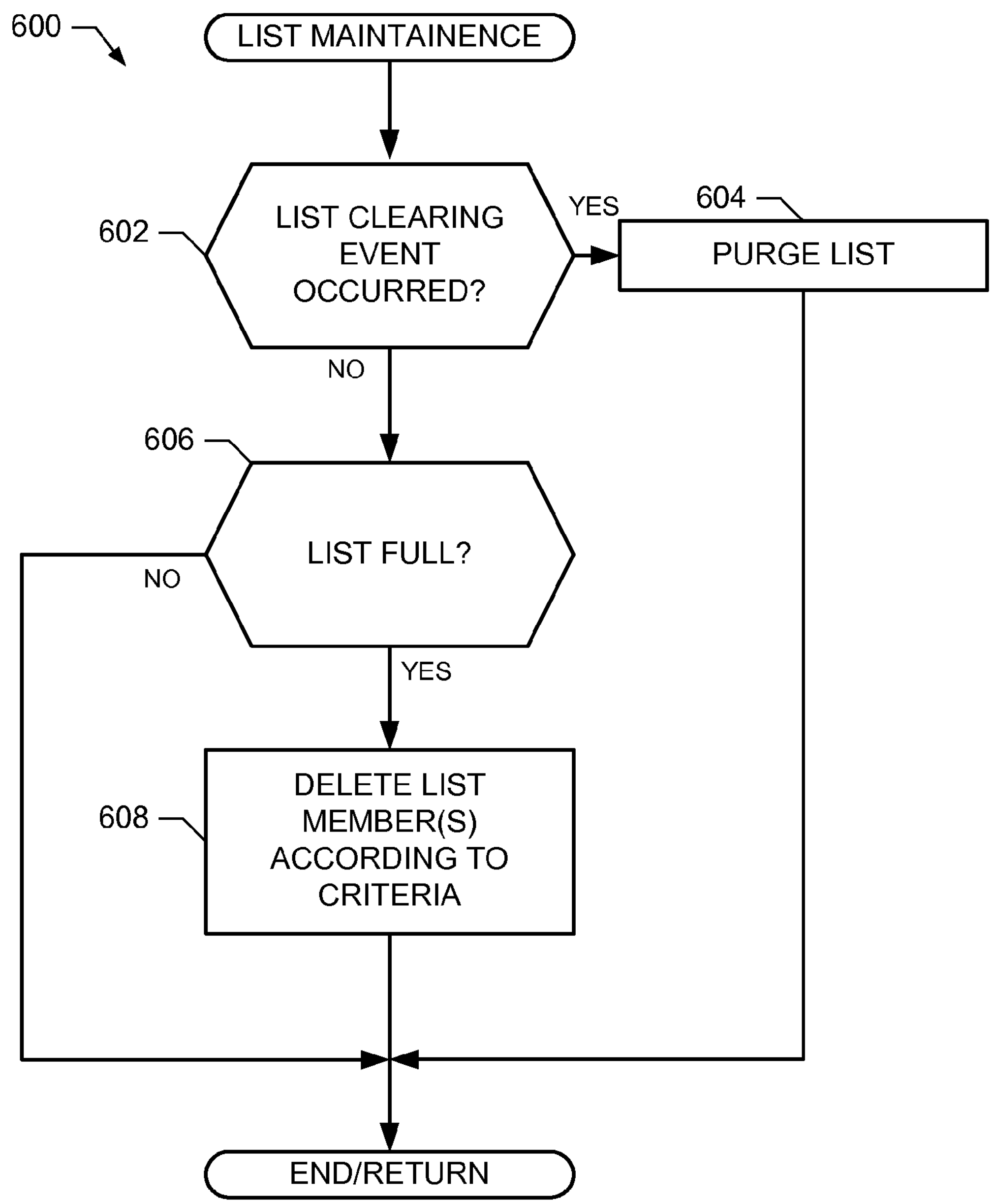
FIG. 6 is a flowchart of an example list maintenance process that may be carried out by a voice-centric UE.

FIGS. 4-6 depict example flow diagrams representative of processes that may be implemented using, for example, computer readable instructions. The example processes of FIGS. 4-6 may be performed using one or more processors (e.g., the processor 712), controllers (e.g., the controller 206), and/or any other suitable processing devices. For example, the example processes of FIGS. 4-6 may be implemented using coded instructions (e.g., computer readable instructions) stored on one or more tangible computer readable media such as flash memory, read-only memory (ROM), and/or random-access memory (RAM). As used herein, the term tangible computer readable medium is expressly defined to include any type of computer readable storage and to exclude propagating signals. Additionally or alternatively, the example processes of FIGS. 4-6 may be implemented using coded instructions (e.g., computer readable instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 4-6 may be implemented using any combination(s) of logic, such as application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 4-6 may be implemented manually or as any combination(s) of any of the foregoing techniques, for example, any combination of firmware, software, discrete logic and/or hardware. Further, although the example processes of FIGS. 4-6 are described with reference to the flow diagrams of FIGS. 4-6, other methods of implementing the processes of FIGS. 4-6 may be employed. For example, the order of execution of the blocks may be changed, and/or some of the blocks described may be changed, eliminated, subdivided, or combined. Additionally, any or all of the example processes of FIGS. 4-6 may be performed sequentially and/or in parallel by, for example, separate processing threads, processors, devices, discrete logic, circuits, etc.

A process 400 that may be carried out by a voice-centric UE (e.g., the UE 102) is shown in FIG. 4. Although the process of FIG. 4 is described in connection with the connection manager 207 of FIG. 3, this is merely one example description and the process of FIG. 4 could be carried out by any portion of the UE 102, including a connection manager 207 that is not configured as shown in FIG. 3.

The connectivity selector 302 of the UE 102 selects use of an LTE network (block 402) and the service availability determiner 304 determines if voice service is available in LTE (block 404). If voice service is available, the connectivity selector 302 uses the LTE voice service (block 406).

However, if the service availability determiner 304 determines that voice service is not available in LTE (block 404) (i.e., that LTE is not preferred for voice service provision), the list maintainer 306 adds the LTE network (e.g., the PLMN ID), or the relevant TAIs of the LTE network to the list 245 (block 408). Voice service unavailability or a preference not to provision voice service through LTE may be because VoIMS is not supported, combined registration for CSFB service failed, the UE 102 failed to register with the internet multimedia control network subsystem for voice, the UE 102 is voice-centric with IMS Voice not available and receives a combined attach accept with a circuit-switched fallback not preferred indication or a short message service only indication. Additionally or alternatively, the list maintainer 306 may add an indication of the PLMN (e.g., a PLMN ID, such as MCC+MNC derived from TAI) to the list 245. The PLMN indicator may also include an indication as to whether all TAs in the PLMN are indicated as not preferred. The list maintainer 306 may timestamp the entries it makes in the list 245 so that later processing may be used to eliminate stale information in the list 245.

The service availability determiner 304 having not found the LTE network as preferable for the provision of voice services (block 404) and the list maintainer 306 making an indication of the same in the list 245 (block 408), the connectivity selector 302 reselects network connectivity to 2G/3G coverage 104 (block 410) and disables the LTE communication capabilities (block 412).

As long as the connectivity selector 302 determines that a 2G/3G failure has not occurred (block 414), the UE 102 camps on the 2G/3G network connectivity 104 (block 416) until it is time for a periodic scan (block 418). If, however, the connectivity selector 302 determines that a 2G/3G failure has occurred, or a connection to 2G/3G connectivity never occurred (block 414), the connectivity selector 302 reenables LTE capabilities and reselects to an LTE network and attempts to obtain voice service (through the same or different PLMN and/or TA). However, even though that LTE network may not be a preferred provider of voice services or may not provide voice services at all (block 420), the UE 102 remains connected to the LTE network without voice services even though the UE 102 is voice-centric, and operates as such until it is time for a periodic scan (block 418).

The decision whether to re-enable the LTE capabilities and/or to remain connected to the LTE network without voice service can be made depending on an operator configuration. The operator can provide such configuration in the UE 102 through, for example, an over-the-air (OTA) technique or through an open mobile alliance device management (OMA DM) message, a specific management object, or a downlink message that is broadcast to a number of UEs or a dedicated transmission to the UE 102.

When it is time for a scan (block 418), a scan, one example of which is shown in FIG. 5, is carried out (block 422). The scan may be a periodic scan or a scan that is triggered by an event (e.g., an application on the UE 102 and/or a scan triggered by a network. As explained below, the scan 422 enables the use of LTE capability when scanning for higher priority PLMNs, in accordance with 3GPP TS 23.122, to ensure the UE 102 has selected the highest priority PLMN. The ability to enable LTE capability can be guided by configurable parameters that can be delivered to the UE 102 by, for example, non-access stratum signaling (NAS) (e.g., ATTACH ACCEPT, TRACKING AREA UPDATE ACCEPT, ROUTING AREA UPDATE ACCEPT, SERVICE ACCEPT, or any other NAS signaling), through an open mobile alliance device management message (OMA DM), or an over-the-air message, such as an SMS.

The scan 422 may be carried out by the connectivity selector 302 and may begin by enabling or re-enabling LTE capabilities to facilitate communication with LTE coverage 103 (block 502). The connectivity selector 302 then searches for network connectivity according to access stratum (AS) criteria (block 504) until connectivity meeting the AS criteria is found (block 506).

In a first example, when the UE 102 uses the list 245 to perform PLMN selection, the connectivity selector 302 searches for a PLMN that is not in the list 245. In a second example, when the UE 102 uses the list 245 to perform cell selection or reselection, the connectivity selector 302 searches for a cell whose TAI is not in the list 245.

After connectivity meeting the AS criteria is found (block 506), the connectivity selector 302 determines if any of the connectivity found is connectivity provided by LTE coverage 103 (block 508). If connectivity found is from LTE coverage 103 (block 508), the connectivity selector 302 accesses the list 245 to determine if the discovered connectivity is on the non-preferred list, and disregards the non-preferred candidates for camping (block 510). By consulting the list 245, the UE 102, which is in a voice-centric mode, avoids selecting or reselecting to those PLMNs and/or TAs in the list because the UE 102 has previously determined that no voice services are provided in, or voice service is not preferably provisioned by those TAs. As explained above, the UE 102 may store one or more lists 245. If the UE 102 stores two lists: "TAs with voice not-available" and "Non-preferred TAs for CSFB," and if the UE 102 is voice-centric and the UE 102 usage setting are set to "CS only," the UE 102 avoids selecting or reselecting to those PLMNs and/or TAs that are not in the "TAs with voice not-available" list but that are in the "Non-preferred TAs for CSFB" list. Operation of the voice domain selection process specified in 3GPP TS 23.221 determines for a voice-centric UE whether there is voice service in a candidate TA and also informs the connectivity selector 302 of the TAs in the TAI list that cannot provide voice services.

After the non-preferred LTE candidates are not considered (block 510), or if no LTE coverage is found (block 508), the connectivity selector 302 opts to camp on candidate connectivity based on criteria specified by the AS (block 512).

A list maintenance process 600, which may be carried out by the list maintainer 306 is shown in FIG. 6. The list maintenance process 600 determines if a list clearing event has occurred (block 602). List clearing events may include, but are not limited to, user-initiated requests to clear the list, the UE 102 being powered down, the SIM 240 being removed from the UE 102, the UE 102 usage setting being changed from voice-centric to data-centric, and/or upon expiration of a timer against which the list contents are compared, wherein the timer is set by a user of the UE 102 or the operator providing network services to the UE 102. If a list clearing event has occurred (block 602), the list maintainer purges 306 the list 245 of some or all entries (block 604).

If no list clearing event has occurred (block 602), the list maintainer 306 determines if the list is full (block 606). In one example, this determination may be made when the list determiner 306 has information to be stored in the list 245 and there is no additional room in the list 245. If the list 245 is full, or sufficiently full to merit deletion of list items, members of the list 245 are deleted from the list 245 according to criteria (block 608). The criteria may include first-in, first-out, whereby the first, or oldest, entry in the list 245 is removed first. This may be accomplished by a comparison of timestamps of list entries.

Figure 7:
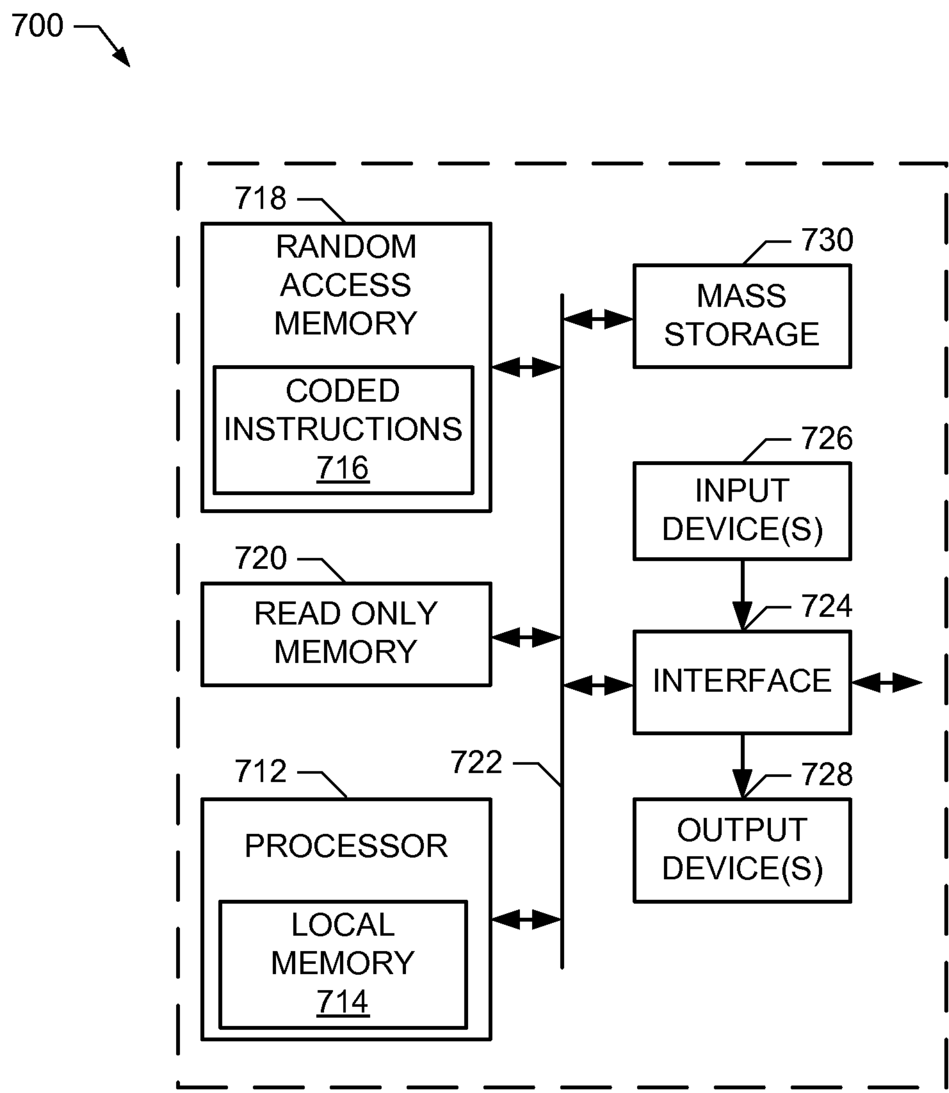
FIG. 7 is a block diagram of an example processing system capable of implementing the apparatus and methods disclosed herein.

FIG. 7 is a block diagram of an example processing system 700 capable of implementing the apparatus and methods disclosed herein. The processing system 700 can correspond to, for example, a mobile station processing platform, a network element processing platform, a server, a personal computer, a personal digital assistant (PDA), an Internet appliance, a mobile phone, or any other type of computing device. For example the processing system 700 may implement the mobile station 102 and any component of the mobile communication networks 104.

The system 700 of the instant example includes a processor 712 such as a general purpose programmable processor, an embedded processor, a microcontroller, etc. The processor 712 includes a local memory 714, and executes coded instructions 716 present in the local memory 714 and/or in another memory device. The processor 712 may execute, among other things, machine readable instructions to implement the processes represented in FIGS. 4-6. The processor 712 may be any type of processing unit, such as one or more microprocessors from the Intel® Centrino® family of microprocessors, the Intel® Pentium® family of microprocessors, the Intel® Itanium® family of microprocessors, and/or the Intel® XScale® family of processors, one or more microcontrollers from the ARM® family of microcontrollers, the PICO family of microcontrollers, etc. Of course, other processors from other families are also appropriate.

The processor 712 is in communication with a main memory including a volatile memory 718 and a non-volatile memory 720 via a bus 722. The volatile memory 718 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 720 may be implemented by flash memory and/or any other desired type of memory device. Access to the main memory 718, 720 is typically controlled by a memory controller (not shown).

The computer 700 also includes an interface circuit 724. The interface circuit 724 may be implemented by any type of interface standard, such as an Ethernet interface, a universal serial bus (USB), and/or a third generation input/output (3GIO) interface.

One or more input devices 726 are connected to the interface circuit 724. The input device(s) 726 permit a user to enter data and commands into the processor 712. The input device(s) can be implemented by, for example, a keyboard, a mouse, a touchscreen, a track-pad, a trackball, an isopoint and/or a voice recognition system.

One or more output devices 728 are also connected to the interface circuit 724. The output devices 728 can be implemented, for example, by display devices (e.g., a liquid crystal display), by a printer and/or by speakers. The interface circuit 724, thus, typically includes a graphics driver card.

The interface circuit 724 also includes a communication device such as a modem or network interface card to facilitate exchange of data with external computers via a network (e.g., an Ethernet connection, a digital subscriber line (DSL), a telephone line, coaxial cable, a cellular telephone system such as an EGPRS-compliant system, etc.).

In some examples, the computer 700 also includes one or more mass storage devices 730 for storing software and data. Examples of such mass storage devices 730 include floppy disk drives, hard drive disks, compact disk drives and digital versatile disk (DVD) drives.

As an alternative to implementing the methods and/or apparatus described herein in a system such as the device of FIG. 7, the methods and or apparatus described herein may be embedded in a structure such as a processor and/or an ASIC (application specific integrated circuit).

As noted above, the foregoing may be implemented in any number of different ways. One of these ways is through a standards-based approach. To that end, the following—illustrate how to facilitate the concepts described herein in communications standards.

3GPP TS 23.122, version 9.2.0, "Architectural Requirements" could specify:

3.7 Non-preferred TAs in E-UTRAN for voice centric MS

To prevent repeated attempts from an EPS capable voice centric MS for getting voice services in TAs in which the MS had tried and failed to get voice services before, the MS keeps a list of "non-preferred TAs for voice services". This list of "non-preferred TAs for voice services" is updated each time the voice centric MS:—

- runs the voice domain selection process as defined 3GPP TS 23.221 [xx] and concludes that voice services is not available in a TA and thus the MS must disable E-UTRAN capabilities and reselect to GERAN/UTRAN; or
- the MS receives reject cause #18 (CS domain available) when MS attempts to register for CS services when in S1-mode and voice domain preference of the MS is "CS voice only".

In these cases, the MS shall store, if not already in the list, the corresponding TAI, plus each TAI in the TAI list if available to the MS, into the "non-preferred TAs for voice services" list. The maximum number of possible entries in this list is implementation dependent but there must be space for at least one entry. This list, if existing, is deleted when:—

- the MS is switched off;
- the SIM is removed;
- the MS usage setting is changed from voice centric to data centric; or
- an implementation dependent timer expires.

When this list of "non-preferred TAs for voice services" is full and more entries have to be stored, the oldest entries are deleted.

The contents of the "non-preferred TAs for voice services" list are not considered for the PLMN selection process of subclause 4.4 of this document. The contents of the "non-preferred TAs for voice services" list are considered for the cell selection and cell reselection processes described in 3GPP TS 25.304[32] and 3GPP TS 36.304[43].

4.9 Avoiding tracking areas in E-UTRAN that do not support voice services

A voice centric MS with entries in "non-preferred TAs for voice services" list, avoids selecting or reselcting to those TAs in this list as the MS has determined that no voice services are provided in those TAs. The running of the voice domain selection process specified in 3GPP TS 23.221 [xx] determines for a voice centric MS whether there is or there is not voice services in that TA and the TAs of the TAI list if that is available to the MS.

Additionally, 3GPP TS 24.301, version 9.2.0 could be augmented to include the changes shown below, wherein underlined text is added and strikeout text is deleted:

4.5 Disabling and re-enabling of UE's E-UTRA capability

When the UE supporting the A/Gb and/or Iu mode together with the 51 mode needs to stay in A/Gb or Iu mode, in order to prevent unwanted handover or cell reselection from UTRAN/GERAN to E-UTRAN, the UE shall disable its E-UTRA capability and does the following:—

- the UE shall not set the E-UTRA support bits of the MS Radio Access capability IE (see 3GPP TS 24.008[13], subclause 10.5.5.12a), the E-UTRA support bits of Mobile Station Classmark 3 IE (see 3GPP TS 24.008 [13], subclause 10.5.1.7) and the ISR support bit of the MS network capability IE (see 3GPP TS 24.008[13], subclause 10.5.5.12) in the ATTACH REQUEST message and the ROUTING AREA UPDATE REQUEST message after it selects GERAN or UTRAN;
- if the UE supports the "non-preferred TAs for voice services" list as defined in 3GPP TS 23.122[6], the TAI of the cell in which the UE is currently in shall be added to the "non-preferred TAs for voice services" list. If the UE has a valid TAI list received from the network at the last registration update or GUTI reallocation, then each TAI of that TAI list shall also be added to the "non-preferred TAs for voice services" list. The "non-preferred TAs for voice services" list shall then be provided to lower layer for cell selection and reselection as defined in 3GPP TS 25.304[15A] and 3GPP TS 36.304[21]; and
- the UE NAS layer shall indicate the access stratum layer(s) of disabling of the E-UTRA capability.

Methods and apparatus for voice domain operation are described herein. One example method includes determining that an LTE network is not preferred for voice service provision; storing an identification of the LTE network that is not preferred for voice service provision; and accessing the stored identification of the LTE network that is not preferred for voice service provision.

As described herein, when UE decides that it will not register to a particular LTE network, the UE stores an indication of that LTE network. That stored information is later used by the UE when selecting or reselecting an LTE network to avoid selection of an LTE network that was previously not desired. Another method described herein includes attempting a connection with a first LTE network to obtain voice service; determining that the LTE network is not preferred for voice service provision; determining that voice service is not available from an alternate network; attempting a connection with a second LTE network to obtain the preferred voice service; determining that the second LTE network is not preferred for voice service provision; and connecting with the second LTE network even though the second LTE network is not preferred for voice service.

According to this method, attempting the connection with the first LTE network includes attempting to connect with a first public land mobile network and attempting the connection with the second LTE network includes attempting to connect with a second public land mobile network different from the first public land mobile network. Connecting with the second LTE network is an operator-controlled configuration. The operator-controlled configuration is provided to user equipment using an over-the-air message, an open mobile alliance device management message, a specific management object, or a downlink message.

Determining that the second LTE network is not preferred for voice service provision comprises receiving a message. The message may be one or more of an indication that voice over internet multimedia subsystem is not supported, an indication that a combined registration for circuit switched fallback service failed, an indication that registration with the internet multimedia control network for voice failed, an indication of a combined attached accept with circuit switched services specified as not preferred, or an indication of a combined attached accept with small message services only specified. In the foregoing, the first LTE network is different from the second LTE network.

Another method includes attempting to connect with an LTE network to obtain voice service; determining that the LTE network is not preferred for voice service provision; disabling LTE capabilities; connecting to an alternate network to obtain voice service; and scanning for a higher priority network connection, the scanning including enabling LTE capabilities and scanning one or more LTE networks, while connected to the alternate network.

Scanning for the higher priority network connection comprises periodic scanning. The scanning for the higher priority network connection, includes enabling LTE capabilities, includes accessing a configurable parameter in user equipment. The configurable parameter may be delivered to the user equipment through non-access stratum signaling, through an open mobile alliance device management message, or an over-the-air message.

Finally, although certain example methods, apparatus and articles of manufacture have been described herein, the scope of coverage of this disclosure is not limited thereto. On the contrary, this disclosure covers all methods, apparatus and articles of manufacture fairly falling within the scope of the appended claims either literally or under the doctrine of equivalents.

What is claimed is:

1. A method in a mobile station comprising:

determining that an LTE network is not preferred for voice service provision, based on receiving a message from the LTE network including a reject cause for voice services, wherein the message is a non-access stratum signaling message in response to a registration for the voice services;

storing an identification of the LTE network that is not preferred for voice service provision; and accessing the stored identification of the LTE network that is not preferred for voice service provision, wherein the reject cause comprises a rejection for circuit switched domain services when a mobile station in an S1 mode having a voice domain preference of circuit switched voice only requests registration for circuit switched services.

2. The method of claim 1, wherein determining that the LTE network is not preferred for voice service provision comprises determining that voice service is unavailable from the LTE network.

3. The method of claim 1, wherein determining that the LTE network is not preferred for voice service provision comprises determining that voice service from the LTE network is less preferred than voice service from another network.

4. The method of claim 1, further including determining that a mobile station is in a voice centric mode of operation.

5. The method of claim 1, wherein the LTE network comprises an evolved UMTS Terrestrial Radio Access Network (E-UTRAN).

6. The method of claim 1, wherein storing the identification of the LTE network comprises storing a public land mobile network (PLMN) identifier of the LTE network that is not preferred for voice service provision.

7. The method of claim 6, further comprising not reselecting to any LTE network with a PLMN identifier that matches the PLMN identifier of the LTE network that is not preferred for voice service provision.

8. The method of claim 6, further comprising not selecting any LTE network with a PLMN identifier that matches the PLMN identifier of the LTE network that is not preferred for voice service provision.

9. The method of claim 1, further comprising reselecting to a different radio access technology.

10. The method of claim 1, further comprising not reselecting to any LTE network previously identified as not preferred for voice service provision.

11. The method of claim 1, wherein the reject cause for voice services is a reject cause for circuit switched domain services.

12. The method of claim 1, wherein the non-access stratum signaling message is a non-access stratum signaling accept message.

13. The method of claim 1, further comprising selecting a different radio access technology.

14. The method of claim 1, further comprising not selecting any LTE network previously identified as not preferred for voice service provision.

15. A computer readable storage disc or storage device comprising instructions that, when executed, cause a machine to at least:

determine that an LTE network is not preferred for voice service provision, based on receiving a message from the LTE network including a reject cause for voice services, wherein the message is a non-access stratum signaling message in response to a registration for the voice services;

store an identification of the LTE network that is not preferred for voice service provision; and access the stored identification of the LTE network that is not preferred for voice service provision, wherein the reject cause comprises a rejection for circuit switched domain services when a mobile station in an S1 mode having a voice domain preference of circuit switched voice only requests registration for circuit switched services.

16. The computer readable storage disc or storage device of claim 15, wherein the instructions cause the machine to determine that the LTE network is not preferred for voice service provision by determining that voice service is unavailable from the LTE network.

17. The computer readable storage disc or storage device of claim 15, wherein the instructions cause the machine to store the identification of the LTE network by storing a public land mobile network (PLMN) identifier of the LTE network that is not preferred for voice service provision.

18. The computer readable storage disc or storage device of claim 17, wherein the instructions further cause the machine to not reselecting to any LTE network with a PLMN identifier that matches the PLMN identifier of the LTE network that is not preferred for voice service provision.

19. A user equipment comprising memory and a processor configured to:

determine that an LTE network is not preferred for voice service provision, based on receiving a message from the LTE network including a reject cause for voice services, wherein the message is a non-access stratum signaling message in response to a registration for the voice services;

store an identification of the LTE network that is not preferred for voice service provision; and access the stored identification of the LTE network that is not preferred for voice service provision, wherein the reject cause comprises a rejection for circuit switched domain services when a mobile station in an S1 mode having a voice domain preference of circuit switched voice only requests registration for circuit switched services.

20. The user equipment of claim 19, wherein the processor is configured to determine that the LTE network is not preferred for voice service provision by determining that voice service is unavailable from the LTE network.

21. The user equipment of claim 19, wherein the processor is configured to store the identification of the LTE network by storing a public land mobile network (PLMN) identifier of the LTE network that is not preferred for voice service provision.

22. The user equipment of claim 21, wherein the processor is configured to not reselect to any LTE network with a PLMN identifier that matches the PLMN identifier of the LTE network that is not preferred for voice service provision.

* * * * *